Dec. 18, 1934.  I. T. BENNETT ET AL  1,985,009
HEATING AND COOLING SYSTEM
Original Filed May 17, 1929   2 Sheets-Sheet 1

INVENTORS
IRVING T. BENNETT
FRANK C. REYNOLDS
BY
ATTORNEYS

Dec. 18, 1934.  I. T. BENNETT ET AL  1,985,009
HEATING AND COOLING SYSTEM
Original Filed May 17, 1929  2 Sheets-Sheet 2

INVENTORS
IRVING T. BENNETT
FRANK C. REYNOLDS
BY
ATTORNEYS

Patented Dec. 18, 1934

UNITED STATES PATENT OFFICE 1,985,009

HEATING AND COOLING SYSTEM

Irving T. Bennett, Rome, and Frank C. Reynolds, New York, N. Y., assignors, by mesne assignments, to Metropolitan Engineering Company, a corporation of New York Original application May 17, 1929, Serial No. 363,873. Divided and this application November 21, 1932, Serial No. 643,705

5 Claims. (Cl. 257—9)

This application is a division of our application Serial No. 363,873 filed May 17, 1929, now matured into Patent No. 1,895,876 issued January 31, 1933.

Our invention relates to heating and cooling apparatus for buildings, and more particularly to apparatus and methods of ventilating or circulating air and for alternatively heating or cooling the air.

Among the objects of our invention are to provide an apparatus in which the cooling or heating effect may be quickly attained and accurately controlled, and in which the air is brought into heat interchanging relation with the heating or cooling means in the most advantageous arrangement for heating or cooling respectively.

A further object of the invention is to provide a system in which the humidity of the air being treated may be controlled either by adding or abstracting moisture, as the circumstances may require.

In our invention fresh air to be treated is mixed with re-circulating air from the rooms being heated and ventilated, the proportions of mixing being controlled to provide the desired ventilating and heating and humidifying effect. The mixed air then passes over or in contact with heat exchange surfaces arranged in close spacing in such a manner as quickly to conduct heat from a heating coil to every part of the air being heated, or to abstract heat uniformly and quickly from each part of the circulating air into a cooling or heat abstracting medium. When used for cooling the close spacing of the heat exchange surface has the added advantage of serving or tending to remove condensed moisture and to collect particles of such moisture, thereby reducing the humidity of the air as it is cooled. The direction of circulation of the air in cooling may be the reverse of its movement when being heated and in this manner the air may be brought into heat interchanging relation with the heating or cooling means either in counter current or in concurrent directions as may be best suited for the particular conditions.

The various features of the invention are illustrated in the accompanying drawings in which Fig. 1 is an elevation partly in section of a system for alternately heating or cooling air for ventilation according to our invention.

Figure 1:
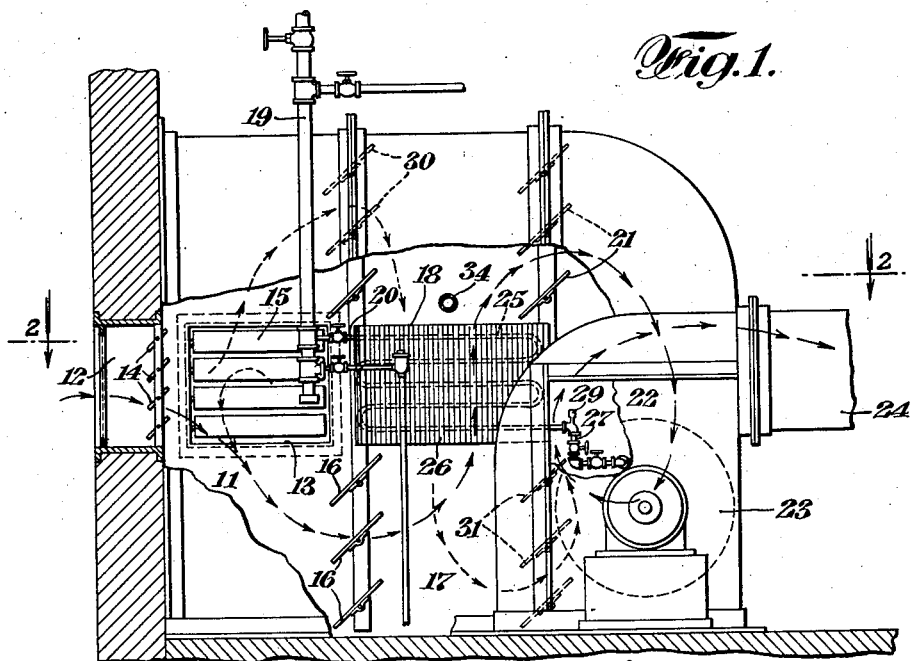
Figure 2:
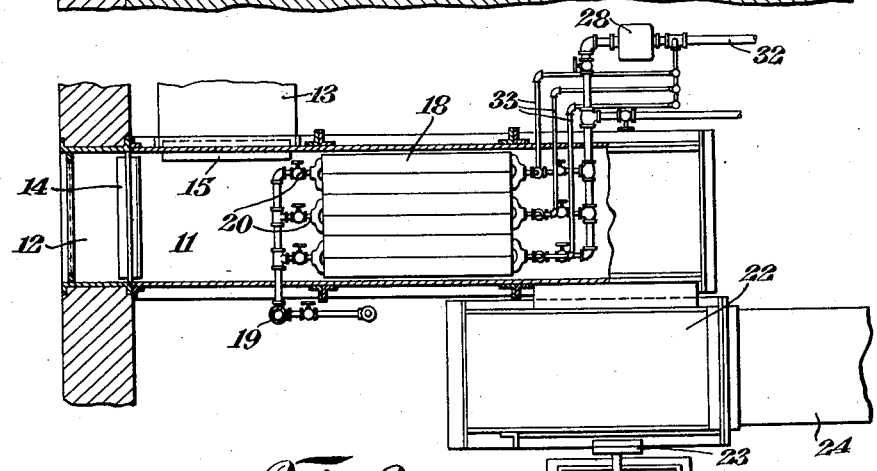
Fig. 2 is a horizontal section of the apparatus taken on line 2—2 of Fig. 1.

Referring to Figs. 1 and 2 of the accompanying drawings an alternative heating and cooling system is shown in which the direction of circulation of air through the heat transfer units may be reversed when changing from a heating to a cooling operation or vice versa. In this form of the apparatus, air is supplied to an entrance chamber 11 through a fresh air inlet 12 and a return flue 13, the quantities or proportions of air admitted through these separate sources being controlled by means of dampers 14 and 15 respectively. When the air is to be heated it passes, as indicated by the full line arrͬ  iⱼ Fig. 1, through dampers 16 in the lower part of the entrance chamber 11 into the lower part of a central heating chamber 17. The air thus enters the chamber 17 below the radiator elements 18 which are supplied with steam from a steam main 19 and branch pipes 20 entering the upper ends of the radiators. The air then passes upwardly through the units 18 to the upper part of the chamber 17 and thence outwardly through dampers 21 to an outlet chamber 22 from which it is drawn by means of a fan 23 and forced into a delivery conduit 24.

The radiator elements 18 are formed with horizontal pipes or tubes 25 through which steam may be passed when air is to be heated, or through which chilled brine or other cooling medium may be passed when air is to be cooled. Securely fastened to the pipes 25 and in good heat conducting relation with them are vertical fins 26, such as shown in Patent 1,731,472, which form narrow vertical passages in intimate contact with the heat distributing vertical fins 26. The radiator pipes 25 are connected with a steam outlet or return pipe 27 and a trap 28 and also with suitable air vent valves 29.

When the apparatus is to be used for cooling the air the dampers 16 and 21 are closed and the dampers 30 between the upper ends of the entrance 11 and the central chamber 17, and dampers 31 between the lower parts of the chambers 17 and 22 below the radiator 18 are open. The air, therefore, passes as indicated by the broken or dotted arrows, into the upper part of the chamber 17, thence downwardly through the unit 18 and dampers 31 into the lower part of the chamber 22, and is then forced by the fan 23 into the delivery conduit 24.

When the units 18 are used for cooling, chilled brine or other refrigerating medium is supplied to the lower end of the unit through a supply pipe 32 and branch pipes 33 and is withdrawn through the pipes 20 and 19.

When the apparatus is to be used for heating, a low pressure perforated steam coil 34 is provided in the chamber 17 for humidifying the air.

Figure 3:
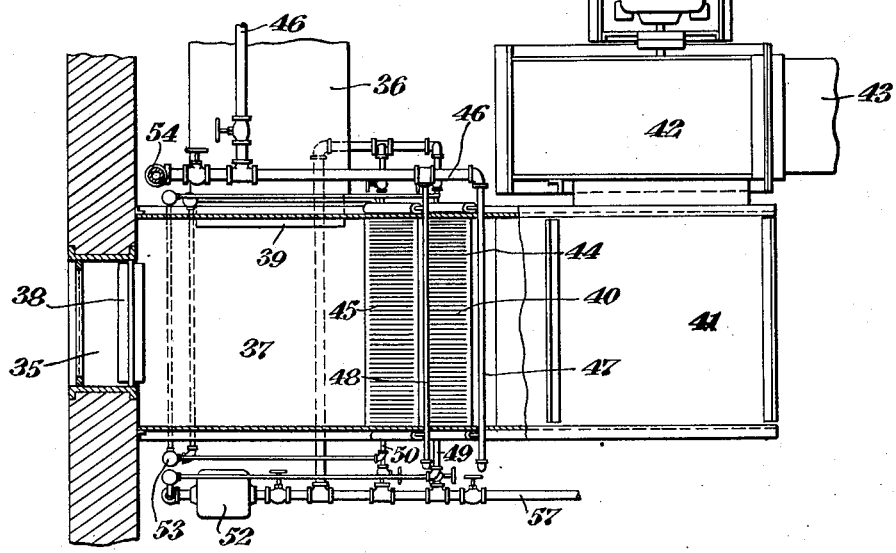
Fig. 3 is a plan view partly in section of a modification of apparatus for alternatively heating or cooling air supplied to a ventilating system.
Figure 4:
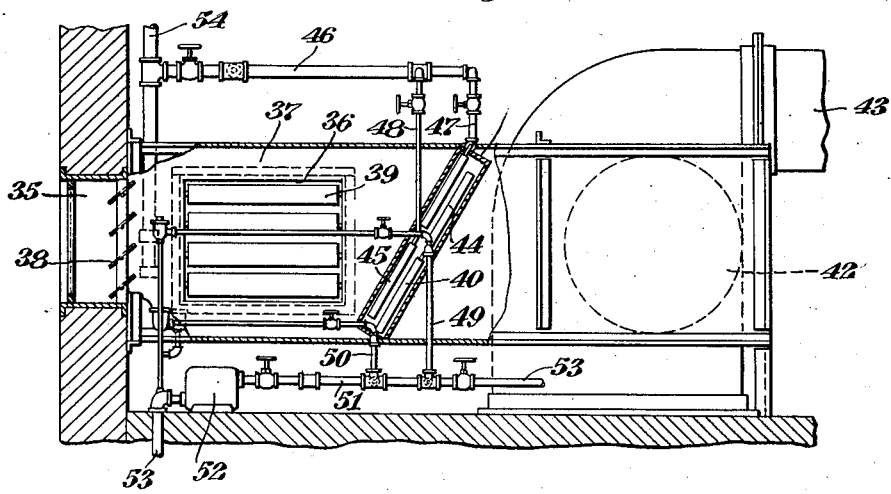
Fig. 4 is a vertical elevation partly in section of the apparatus shown in Fig. 3.

In the form of the invention shown in Figs. 3 and 4 a simpler arrangement is shown in which the air passes at all times in a single direction through the radiators. In this modification, fresh air is admitted through the inlets 35 and recirculating air through return flues 36 to the inlet end of an air passageway 37, suitable dampers 38 and 39 being provided to control the relative proportions of fresh air and recirculating air. The air then passes horizontally through inclined radiator elements 40 to the outlet end 41 of the passageway 37, from whence it is withdrawn by means of a fan 42 and supplied to a supply duct 43. The radiator units may be arranged in two or more sets 44, 45, one above the other, to entirely fill the cross sectional area of the passageway 37.

When used for heating, the system is supplied through a supply pipe 46 and through branch pipes 47 and 48 to the upper ends of the radiators 44 and 45, the exhaust steam being withdrawn from the bottom of the radiators through outlet pipes 49 and 50 and a pipe 51 to a steam trap 52. When used for cooling, chilled brine or other cooling medium is supplied through a supply pipe 53 and the pipes 49 and 50 to the lower ends of the radiators and is withdrawn from the upper ends through the pipes 47 and 48 and an outlet pipe 54.

It will be apparent that in this case also the use of the Murray fin type of radiator in the above arrangements enables the condensed moisture to readily flow to the lower part of the passageway 37 and to be removed, and also enables the apparatus to be fitted or accommodated to air heating and cooling apparatus of wide range of capacities. In this modification two pair of radiators are arranged at a slight angle to the vertical and with the heat distributing vanes and the passages between said vanes at a slight downward inclination from the horizontal.

As the air passes through the radiators in a general horizontal direction and is broken up in passing between the radiator vanes any condensed moisture is caught on the sides of the vanes and readily forced out of contact with the passing air current.

It will be apparent also that in addition to the uniform and expansive contact surfaces between the heating or cooling medium and the air, coupled with the light weight of the radiating elements, the apparatus is quickly responsive and, therefore, easily controlled to attain any desired condition of the air being treated.

What we claim is:

1. Ventilating and temperature control apparatus which comprises an air passageway, a heating and cooling means in said passageway, means for alternatively supplying a heating or cooling medium to said heating and cooling means, an inlet chamber, an outlet chamber, means for passing air from said inlet chamber through said air passage to said outlet chamber, and two pairs of dampers between said air passageway and said inlet and outlet chambers, one of each pair being on opposite sides of said passage whereby air from said inlet chamber may be caused to pass in either direction through said air passageway.

2. Ventilating and temperature control apparatus which comprises an air passageway, a heating and cooling means in said passageway, means for alternatively supplying a heating or cooling medium to said heating and cooling means, an inlet chamber, an outlet chamber, means for passing air from said inlet chamber through said air passageway to said outlet chamber, and two pairs of dampers between said passageway and said inlet and outlet chambers, one of each pair being on opposite sides of said passage whereby air from said inlet chamber may be caused to pass in either direction through said air passageway, means for admitting air to said inlet chamber from the exterior or from a return flue, and dampers for proportioning the air from said return flue and the exterior.

3. Ventilating and temperature control apparatus which comprises a vertical air passageway, a heating and cooling means in said passageway, means for alternatively supplying a heating or cooling medium to said heating and cooling means, an inlet chamber, an outlet chamber, means for passing air from said inlet chamber through said vertical passage to said outlet chamber and two pairs of dampers between said vertical passageway and said inlet and outlet chambers, one of each of said pairs of dampers being on opposite ends of said vertical passage from the other of said pairs, the upper damper of one pair and the lower damper of the other being capable of being opened or closed, whereby air from said inlet chamber may be caused to pass either upwardly or downwardly through such vertical air passageway.

4. Ventilating and temperature control apparatus which comprises a vertical air passageway, a heating and cooling means in said passageway, means for alternatively supplying a heating or a cooling medium to said heating or cooling means, an inlet chamber, an outlet chamber, means for passing air from said inlet chamber through said air passageway to said outlet chamber, and two pairs of dampers between said vertical passageway and said inlet and outlet chambers, one damper of each pair being on opposite ends of said vertical passageway from the other, and the upper damper of one pair and the lower damper of the opposite pair being opened and closed alternatively to the opening and closing of the other dampers of said pairs, whereby air from said inlet damper may be caused to pass either upwardly or downwardly through said vertical passageway, means for admitting air to said inlet chamber from an exterior source, a return flue leading to said inlet chamber, and dampers for proportioning the air from said return flue and from said exterior source.

5. Apparatus of the type described which comprises an air passageway, heating elements for the supply or abstraction of heat, said elements being mounted at different levels and having extended surfaces for the transmission of heat and condensation of moisture, said surfaces being spaced throughout the cross-sectional area of said passageway and positioned to form passages without change in direction transversely through said heating elements, and means for supplying heating medium to the upper ends of said heating elements or alternatively supplying cooling medium to the lower ends thereof.

IRVING T. BENNETT.
FRANK C. REYNOLDS.